United States Patent [19]

Clyne et al.

[11] 4,373,133
[45] Feb. 8, 1983

[54] METHOD FOR PRODUCING A BILL, APPARATUS FOR COLLECTING ITEMS, AND A SELF-SERVICE SHOP

[76] Inventors: Nicholas Clyne, 152 Queen's Park Rd.; Philip L. Sturgeon, 58, Southdown Ave.; Lawrence H. Wright, 144 Tivoli Crescent North, all of Brighton, Sussex, England

[21] Appl. No.: 221,309

[22] Filed: Dec. 30, 1980

[30] Foreign Application Priority Data

Jan. 3, 1980 [GB] United Kingdom ............... 8000222

[51] Int. Cl.³ .................... G06F 15/84; G06K 19/06
[52] U.S. Cl. .................................... 235/383; 235/385
[58] Field of Search .................. 235/383, 385; 177/1

[56] References Cited

U.S. PATENT DOCUMENTS

| | | | |
|---|---|---|---|
| 3,836,755 | 9/1974 | Ehrat | 235/383 |
| 4,157,738 | 6/1979 | Nishiguchi | 177/1 |
| 4,180,204 | 12/1979 | Koenig | 235/385 |

Primary Examiner—Harold I. Pitts
Attorney, Agent, or Firm—Larson and Taylor

[57] ABSTRACT

To reduce time spent at the check-out of a self-service shop, each customer is provided with an electronic recording unit mounted on the receptacle used to collect items for purchase. The unit has a memory store for data identifying the items collected. The prices and gross weights of the items are summed, e.g. by extraction of data from a data store in the unit or from data input from a bar code on the items themselves. The collection of items is weighed as a whole at the check-out for comparison of the measured weight with the computed sum of the gross weight of the individual items.

5 Claims, 6 Drawing Figures

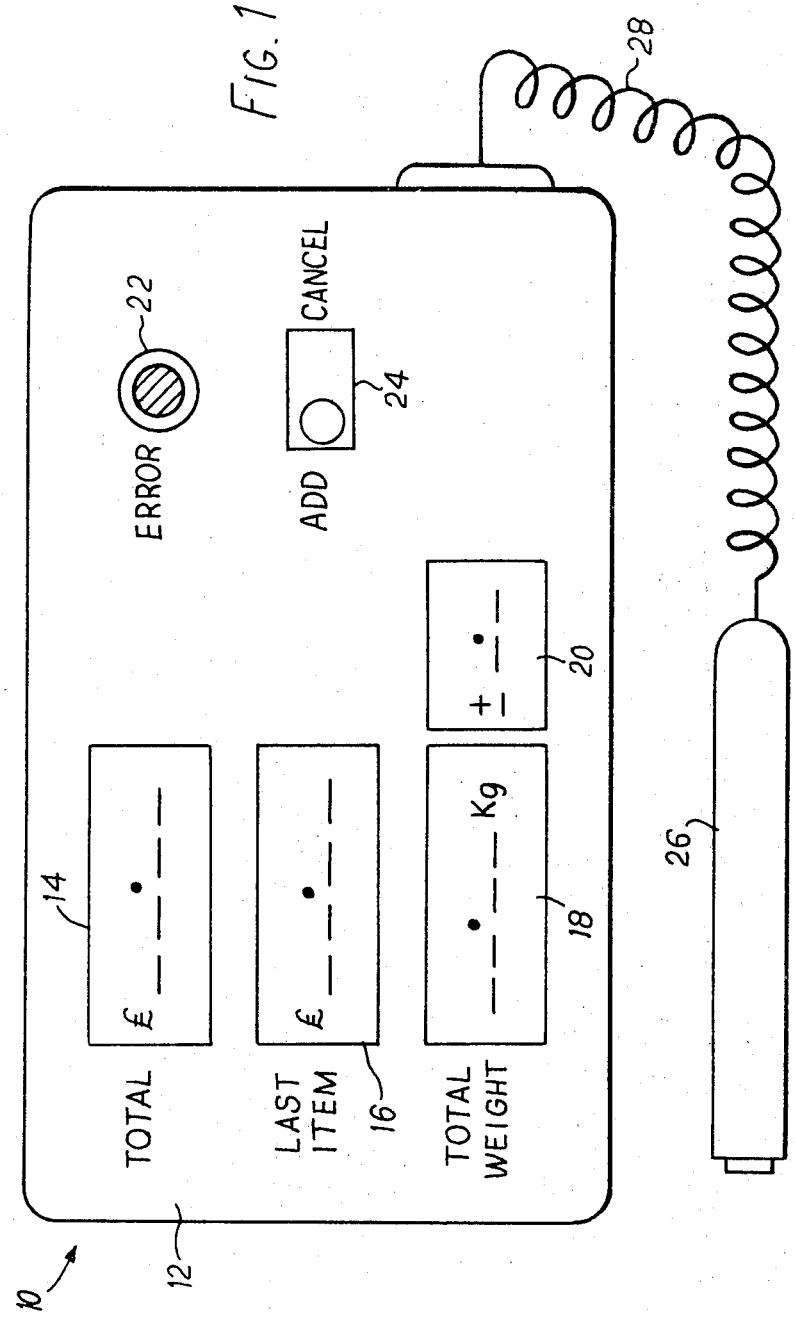

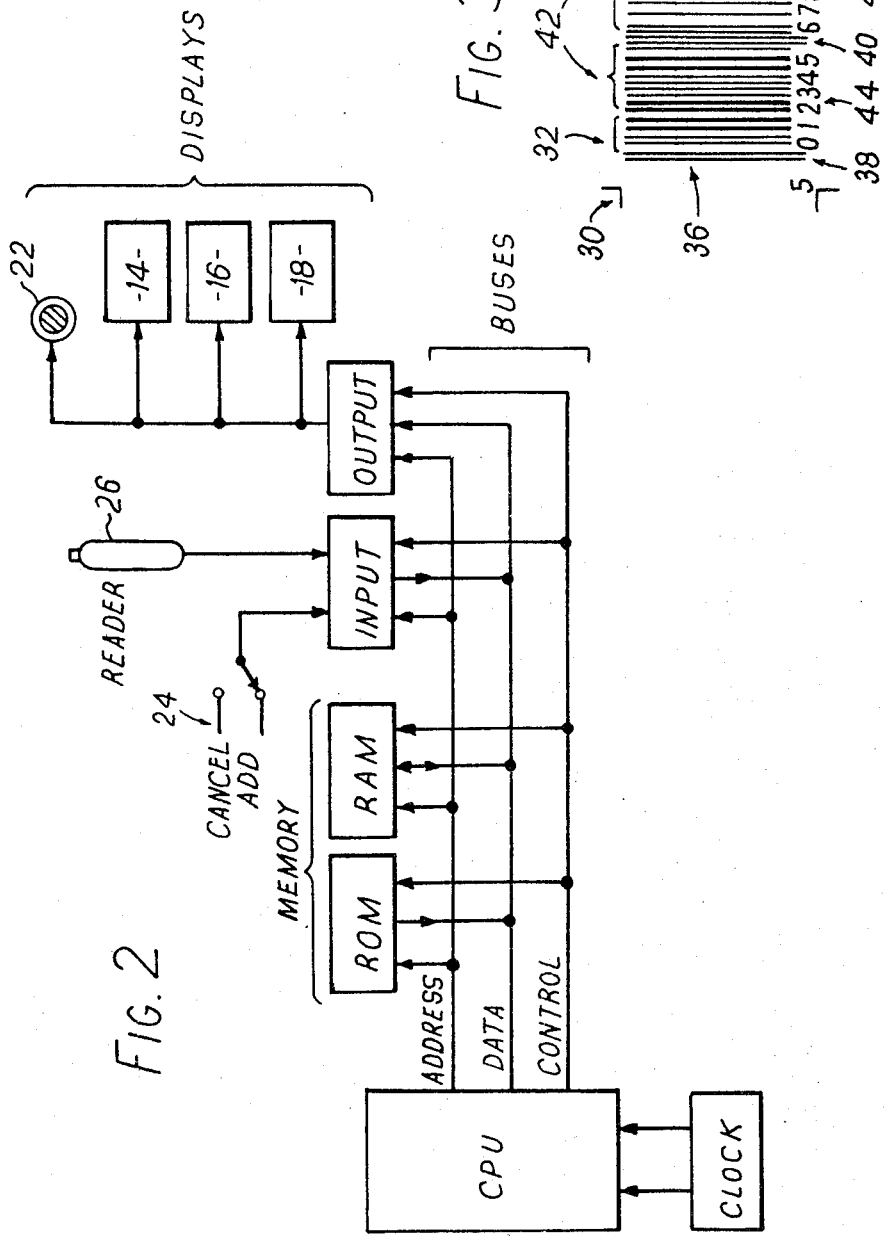

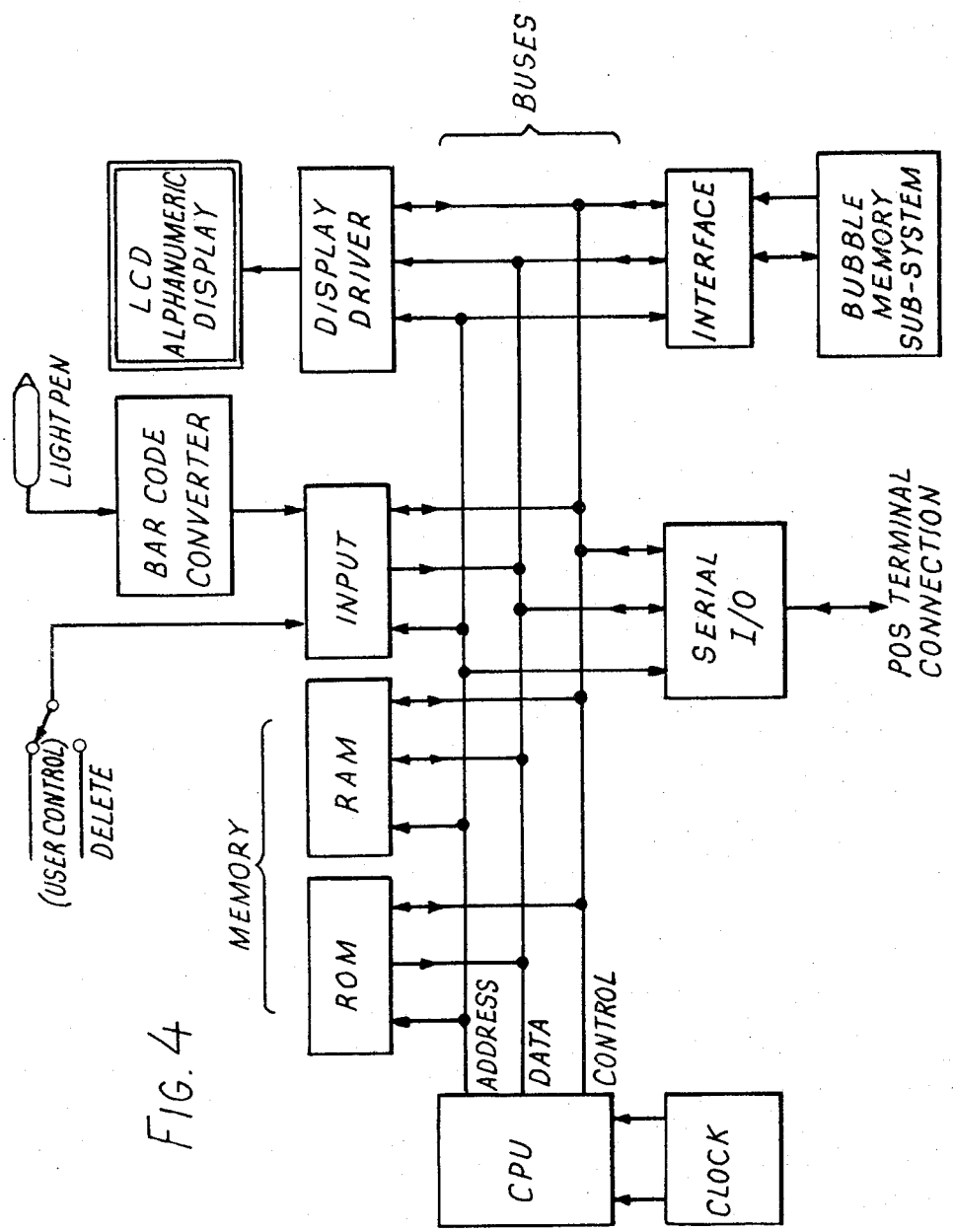

METHOD FOR PRODUCING A BILL, APPARATUS FOR COLLECTING ITEMS, AND A SELF-SERVICE SHOP

BACKGROUND OF THE INVENTION

1. Field of the Invention

The present invention relates to a device and method for use in producing a bill for a plurality of items. The term bill is here used to include items such as a checkout list, a receipt, till roll and the like.

2. Description of the Prior Art

In conventional self-service shopping individually price marked goods are usually arranged on open shelves or the like for selection by the customer as he walks around the shop or store. A wire trolley or basket is normally provided for the customer to receive each item as he removes it from the shelf and to carry his completed selection of goods to a sales terminal or check-out area. At the sales terminal the customer unloads his trolley or basket on to a first part of a counter or conveyor belt where one or more assistants handles each item separately, examines it to find where the price is marked, enters the marked price in a cash register and places the item on a second part of the counter or conveyor belt. The conveyor belt, or a shute leading from the counter, takes the goods to a loading area where the customer packs the goods into bags, either purchased at the sales terminal or brought with him for the purpose. When the price of each item has been entered in the cash register the register computes the total cost of the goods which the customer is obliged to pay. On receipt of the money the assistant gives the customer a till roll produced by the cash register listing each price entered in the register and the total cost.

In a large self-service store six or more sales terminals are usually provided to cope with the throughflow of customers. Nonetheless the time it takes for each item in a customer's selection of goods to be unloaded, handled by the assistant and repacked can be considerable. During a busy period, or if insufficient sales terminals are available, customers are frequently obliged to queue to wait their turn at a sales terminal. The problem is particularly acute in so-called food supermarkets which sell both food and a range of household goods where many customers regularly purchase fifty or more items at any one time.

SUMMARY OF THE INVENTION

It is an object of the present invention to provide a method for use in producing a bill that reduces the time taken by a customer to pass through a sales terminal and so to facilitate his shopping. It is a further object of the present invention to provide a device that facilitates the operation of a self-service shop or store and so reduces its running costs.

According to a first aspect of the invention we provide a method for use in producing a bill for a collection of items each of which is successively selected for inclusion in the collection, the method comprising the steps of:

(i) recording in a memory store of an electronic recording unit data identifying each item, the recording taking place on the inclusion of each item in the collection;

(ii) summing the price of each recorded item to produce an aggregate price indication for the collection;

(iii) summing the gross weight of each recorded item to produce an aggregate gross weight indication for the collection; and (iv) weighing the collection to produce a measured gross weight indication for the collection; thereby enabling the aggregate gross weight indication and the measured gross weight to be compared.

The indication of the gross weight of each item includes an indication of the amount by which the gross weight of any particular sample of that item can allowably vary from the mean gross weight of that item, i.e. its standard variation; and the aggregate gross weight indication also includes a summation of the standard variation of each item in the collection thereby indicating an aggregate predetermined limit.

Where the aggregate gross weight indication corresponds to the measured gross weight within the predetermined limit a bill can be produced for the collection equal to the aggregate price indication. Where a discrepancy exists between the aggregate gross weight indication and the measured gross weight which is outside the predetermined limits the price of the collection of goods can be computed with reference to each item included in the collection.

In practice the method of the invention can be operated in a number of ways. Step (ii) and/or step (iii) can take place either on the inclusion of each item in the collection or once the collection is complete. In the latter case the respective summing of the price and gross weight of each recorded item takes place with reference to a central data source, the memory store of the electronic recording unit containing the identity data being combined with the data source which contains the gross weight and price of each item in the supermarket thereby producing a bill which can give the identity of each item as well as its price. Where steps (ii) and/or (iii) take place on inclusion of each item in the collection the method preferably comprises recording the price and/or gross weight respectively of each item in the memory store of the electronic recording unit in addition to the said identity data. If desired the unit can be adapted so that the aggregate price and/or aggregate gross weight of the collection can be determined as each item is successively added.

In a preferred embodiment, data of the gross weight and price of the items in the supermarket available for inclusion in the collection are recorded in a data store, within the electronic recording unit itself, and steps (ii) and (iii) take place on inclusion of each item in the collection, by reference to that data store.

According to a second aspect of the present invention we provide apparatus for collecting a collection of a plurality of loose items comprising (a) a container to receive said collection of items;

(b) an electronic recording unit mounted on said container and having a memory store adapted to record data identifying each item included in the collection;

(c) means for inputting said data identifying said item into said memory store at the time of inclusion of the item in the collection.

The device preferably includes electronic reading means to read an indication of the said data for each item and to enter the said data in the memory store of the unit. The reading means is preferably a light pen, the indication of the said data suitably being a bar code which can either be attached to each item or be displayed on or near the shelf or the like on which the item is displayed.

The memory store of the unit can either be adapted to record the price and gross weight of each item as it is added to the collection or be adapted for combination with a data source containing the price and gross weight of each item. In the former case the respective recorded price and gross weight of each item is conveniently summed as it is added to the collection to produce an aggregate price indication and an aggregate gross weight indication. The unit preferably includes means to display at least the aggregate price, both once the collection is complete and during the time that the collection is being accumulated.

In a preferred embodiment, the unit itself includes a data store for recordal of data of the gross weight and price of the items available in the supermarket for inclusion in the collection, arranged such that the memory store of the unit can record by reference to its data store the price of every item included in the collection. Here, the attachment means need not be on the unit but may be on the receptacle. The data store may be in the form of a bubble memory.

The present invention extends to the combination of the device with the receptacle, which can for example be a basket or trolley. Preferably the device is clipped to or otherwise attached to the receptacle so as to be readily removable from it.

The present invention furthermore extends to the combination of items (included for sale in a shop or supermarket) in combination with machine readable data indicative of gross weight; such data may be fast with the items or separate in proximity with a storage location of those items. Preferably the machine readable data includes an indication of permissible weight variation or tolerance.

In the forms of the invention in which data of the gross weight and price of the items in the supermarket available for inclusion in a collection is recorded in a data store of the unit, it will suffice for those items to be associated with data merely identifying each such items; but additional items may be made available in the supermarket that are associated with data not merely identifying the item but additionally indicative of gross weight and price.

BRIEF DESCRIPTION OF THE DRAWINGS

An embodiment of the present invention will now be described by way of example only with reference to the accompanying drawings; wherein:

FIG. 1 is a front elevational view of a device embodying the present invention;

FIG. 2 shows a circuit for inclusion in the device of FIG. 1;

FIG. 3 illustrates an example of a bar code for use with the device of FIG. 1;

FIG. 4 shows another form of circuit for inclusion in the device of FIG. 1 and including a data store.

DESCRIPTION OF THE PREFERRED EMBODIMENTS

Figure 5:
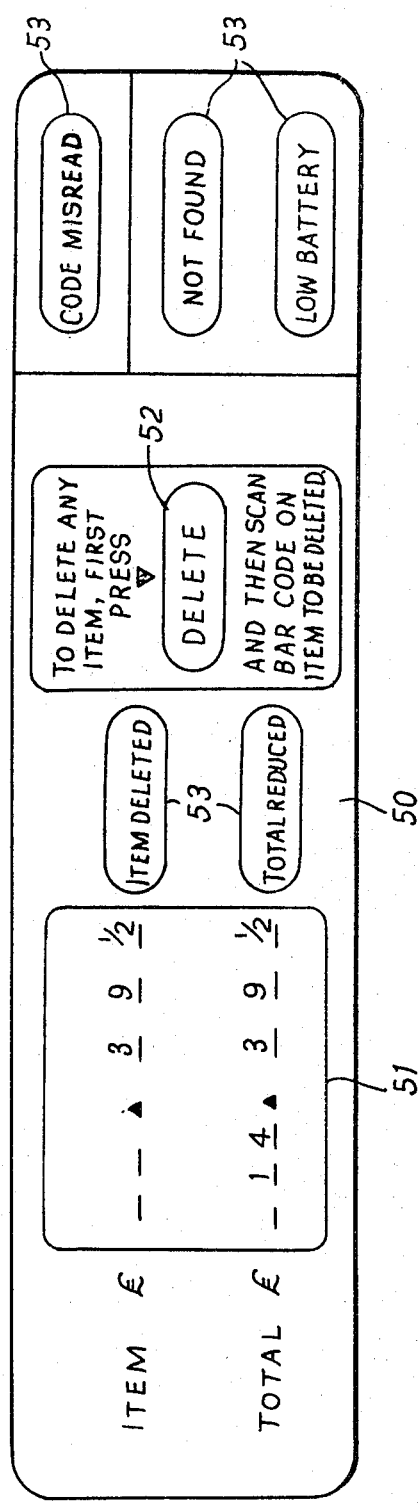
FIG. 5 shows the display panel of the item recorder and display unit in a further embodiment.

Referring firstly to FIGS. 1 and 2 the device includes an electronic recording unit 10 which has a front display panel 12 comprising four separate light arrays 14, 16, 18 and 20, an error indicator 22 and an "add/cancel" switch 24 all controlled by the circuit of FIG. 2. A light pen 26 forms part of the circuit and is attached to the body of the unit by an extendable flex 28. The pen 26 is adapted to read bar codes and to transmit data therefrom to a CPU (Central Processing Unit) and RAM (Random Access Memory) in the circuit of FIG. 2. Although not shown in the drawings the device also includes a spring loaded clip to attach the unit detachably to a trolley or basket.

An example of a bar code which is to be read by the pen 26 is shown in FIG. 3. The illustrated code conforms to the EAN (European Article Number) system and comprises the following components: corner marks 30, flag digits 32, module check digit 34, light margins 36, guard bars 38, a centre pattern 40, data-containing patterns 42 and eye readable characters 44. In the present embodiment the data containing pattern is coded for each item so as to include an indication identifying the item, an indication of the price of the item and an indication of the gross weight of the item. The indication of the gross weight of the item also includes an indication of the amount by which the gross weight of any one particular sample of the item can allowably vary from the mean gross weight for that item.

The circuit of FIG. 2 is arranged to receive data from successive bar codes read by the light pen 26. The data identifying each item is stored, whilst those concerning respectively the price and gross weight are computed to produce an aggregate price and an aggregate gross weight. Array 14 is arranged to display the aggregate price and array 18 to display the aggregate weight. The cumulative deviation from the mean gross weight for the collection is displayed in array 20. Array 16 displays the price of the item whose bar code has most recently been read by the light pen. The price and gross weight are added to the aggregate totals when switch 24 is in the "add" position, as shown in FIG. 1. The last entry can however be cancelled and deducted from the aggregates by moving the switch 24 to a "cancel" position. Error indicator 22 is a light which indicates when an entry is improperly recorded and tells a user that a particular bar code should be read again by the light pen 26.

The illustrated device is intended for use in a supermarket. To accommodate the use of the device the supermarket must be equipped with a number of sales terminals which each incorporates a weighing machine and a cash register or the like, a supply of baskets and trolleys each equipped with the present device and if necessary specially adapted to accept the device, and means to ensure that each item in the store is provided either on its packaging or on its display shelf with an appropriate bar code. Where the bar code appears on the packaging of an item it can either be printed on the packaging by the manufacturer or be a separate label or tag attached to the item. Separate stick-on labels are particularly convenient for use with commodities such as frozen or fresh meat, fish, fruit and vegetables where individual packaging of the commodities can result in a wide range of weights, and hence prices, for similar items. It a store undertakes packaging of such commodities it must additionally be equipped with one or more machines capable of applying not only a ticket as at present showing the net weight and price of the item, but also an appropriately printed bar code containing in addition to the identity of the item the gross weight and price of the item. Stick-on labels are also convenient where a store wishes to price its own goods at a price different from that recommended by the manufacturer.

Appropriate bar code printing machines would need to be provided in the store for this purpose.

On entering the supermarket a customer takes one of the trolleys or baskets to which the device is attached by means of its spring clip. A loose plastic bag or bags can conveniently be provided in each basket or trolley into which the customer places the items he selects off the shelves as he walks around the store. On including each item in his collection the customer takes the light pen 26 attached to the unit on his basket or trolley and moves it across a bar code for that item. If the switch 24 is in the "add" position array 14 shows him the aggregate cost of his collection so far and array 16 the price of the item whose bar code has most recently been traversed by the light pen. If he has mistakenly traversed the wrong bar code or decided he no longer wants his most recently selected item, the customer moves the switch 24 to the "cancel" position to deduct the last made entry from the aggregate price and weight. If a bar code is improperly read the error indicator 22 will light to tell the customer to pass the light pen over the same bar code again.

Once the customer has completed his collection he proceeds to a sales terminal. The bag or bags containing the items are placed on the weighing machine. If the measured weight corresponds to the aggregate weight displayed on the device within the limits indicated in array 20 (arrays 18 and 20 need only be actuated once the customer reaches a sales terminal) an assistant produces a bill on the cash register equal to the total aggregate price shown on the unit. Having paid the bill the customer takes the bag(s) containing the purchases and departs. If the measured weight differs from the displayed weight by an amount which falls outside the limits shown in array 20 the customer's collection is unloaded and priced item by item in the conventional fashion. If desired the device can be adapted for electronic engagement with the weighing machine. The comparison between the measured weight and the range of weight displayed in arrays 18 and 20 can thus be made automatically. A signal such as a red/green light can be actuated to tell the assistant whether the aggregate price displayed in array 14 can be charged. Disengagement of the device from the weighing machine can be arranged to reset to zero each of the displays. Alternatively all entries in the device can be cancelled by the assistant to make it available for another customer.

The present invention can thus provide a method of establishing the amount chargeable to a customer which takes very little time at a sales terminal. The need for customers to queue is thus substantially removed as the time taken by each customer at a check out point can be a tenth or less of that taken at a conventional check-out point. Once the customers and assistants are accustomed to the system the number of sales terminals may even be reduced allowing a significant saving in running costs. The above described device moreover allows a customer to know the aggregate price of his collection at any one time.

Various modifications can be made to the illustrated device and the method described above. The unit can for example include an item-count to count each entry comprised in the aggregate price and to display the number counted. The number of items recorded can be an aid to stock taking and sales analysis and can also help detect fraud.

As a further aid with which to combat dishonesty and also as a checklist for customers the unit can be arranged to be combined with a cash register which is specially adapted to read the data stored in the unit and to produce a print out giving the identity of each item against its price (and if desired gross weight) and the total price (and if desired gross weight) of the collection. The print out then serves as the bill and can, if need be, be used to challenge a dishonest customer as to the recorded contents of his collection compared to its actual content. Engagement of the unit with the cash register can be linked with the weighing machine. Comparison between the measured weight and the recorded gross weight indication can be made electronically and a signal actuated to indicate whether or not the two weights correspond closely enough to allow the customer to pay the displayed total price. Disengagement of the unit from the register can be arranged to reset to zero the entries in the unit to make it available for another customer.

The device and method of the present invention can be adapted for use with a central data source. In such an arrangement the device need only be capable of recording data which identifies each item included in the customer's collection. On reaching the sales terminal the assistant takes the device and combines its stored information with a central data source which contains data concerning the price and gross weight of each item in the store. A computer print out gives a description of each item entered in the unit against its price and gross weight together with an aggregate gross weight and aggregate price for the collection. Once the collection has been weighed the comparison between the measured and computed weight can be made and the procedure followed as above. The computer print out can serve as a customer's bill and gives him a detailed check list of his purchases. The combination of each customer's unit with the central data source also allows immediate up-dating of stock control systems for the store and provides ready access to sales analysis. This embodiment is of particular economic advantage to the shop owner, and eventually to the customer in terms of lower prices. Any price changes can be readily entered in the central data source and will immediately be incorporated in the customer's bill. As only data concerning the identity of each item need be included in each bar code no change need be made to the bar codes attached to each item or displayed on the shelves. Eye-readable labels on the shelves indicating the price would need changing but there is no necessity to alter the price tag on each individual item or indeed to place such a tag on each item initially. The price marking of individual items is thus obviated resulting in a considerable saving in employees' time and a consequential saving in running costs. Where the measured weight of a collection of items does not correspond to the computed weight within the allowable limits the collection can be readily priced at a sales terminal with reference to the central data source.

Other modifications which can be made to the device include incorporating shopping aids for the customer and even advertisements. For example the device could include a memory store programmed with the locations of particular items in the store. The customer can then key in his request for a particular item and a display on the device could show him the location in terms of aisle and bin numbers. A time switch or a clock and alarm can be included in the device. If the customer has only a limited amount of time to spend in the store (if for example his car is parked at a parking meter or he wants to take a particular bus or train) he can set the time switch or alarm on entering the store to give an audible signal when a preset period has elapsed. Loud speakers can also be incorporated in the device. For example when the device has recorded a particular item the speaker can be programmed to tell the customer of the benefits of buying more of the same item for example the offer of a third sample of the item free of charge if he takes and records a second sample.

Yet another modification which can be made to the device would be to rearrange the function of the "add/cancel" switch 24 so that in place of cancelling the last selected item from the recording when in the cancel position, it can delete from the recording, the price and gross weight (or other identifying details) of any previously selected item by reading the bar code of that item. In that way, with the switch 24 in the cancel position, previously selected items (and not merely the one last selected) can be discarded by the shopper.

FIG. 4 is the circuit diagram of a preferred form of the electronic recording unit 10 and differs from that of FIG. 2 primarily in that it includes a data store in the form of a magnetic bubble memory sub-system of e.g. 128 Kilobyte capacity. This constitutes a data store for indications of particulars of the items for sale in the supermarket, viz those indicative of identity, gross weight (including means gross weight and standard weight variation) and price. The items for sale in the supermarket then need carry or be otherwise associated only with an identity indication, e.g. in the form of a standard EAN bar code (or any other bar code, e.g. the UPC standard bar code). Upon inclusion of an item in the collection of items being placed by a shopper in his supermarket trolley, the reading of the bar code by the light pen leads not only to a recording in the memory store of the unit of an indication of the identity of the item, but additionally to reference being made to the unit's data store for the other particulars of that item (i.e. gross weight—mean and standard variation, and price) and their recordal in the memory store, coupled with simultaneous summation of weight and price, and display of the price of the item and the aggregate price so far.

Any item not associated with a standard bar code (standard codes being mostly in current use for "manufactured food items"), can bear or be otherwise associated with a full bar code indicative of all the particulars of that item, viz identity, weight and price; this will apply mainly to items not of standard weight such as frozen chickens, fresh meat, cheese, fresh fruit etc. Upon the inclusion of these in the collection, the relevant indications will be recorded in the unit's memory store directly from the bar code without reference to the unit's data store.

The unit is securely fastened to the supermarket trolley so that the customer cannot detach it and has a user control lead by which the supermarket's check out attendant can take a read-out of the memory store's recording (and reset it in readiness for re-use).

The data recorded in the unit's data store can be entered and varied as necessary and by reason of the attributes of magnetic bubble memory systems the recording is retained, until varied, notwithstanding discontinuance of electricity supply to the device.

Figure 6:
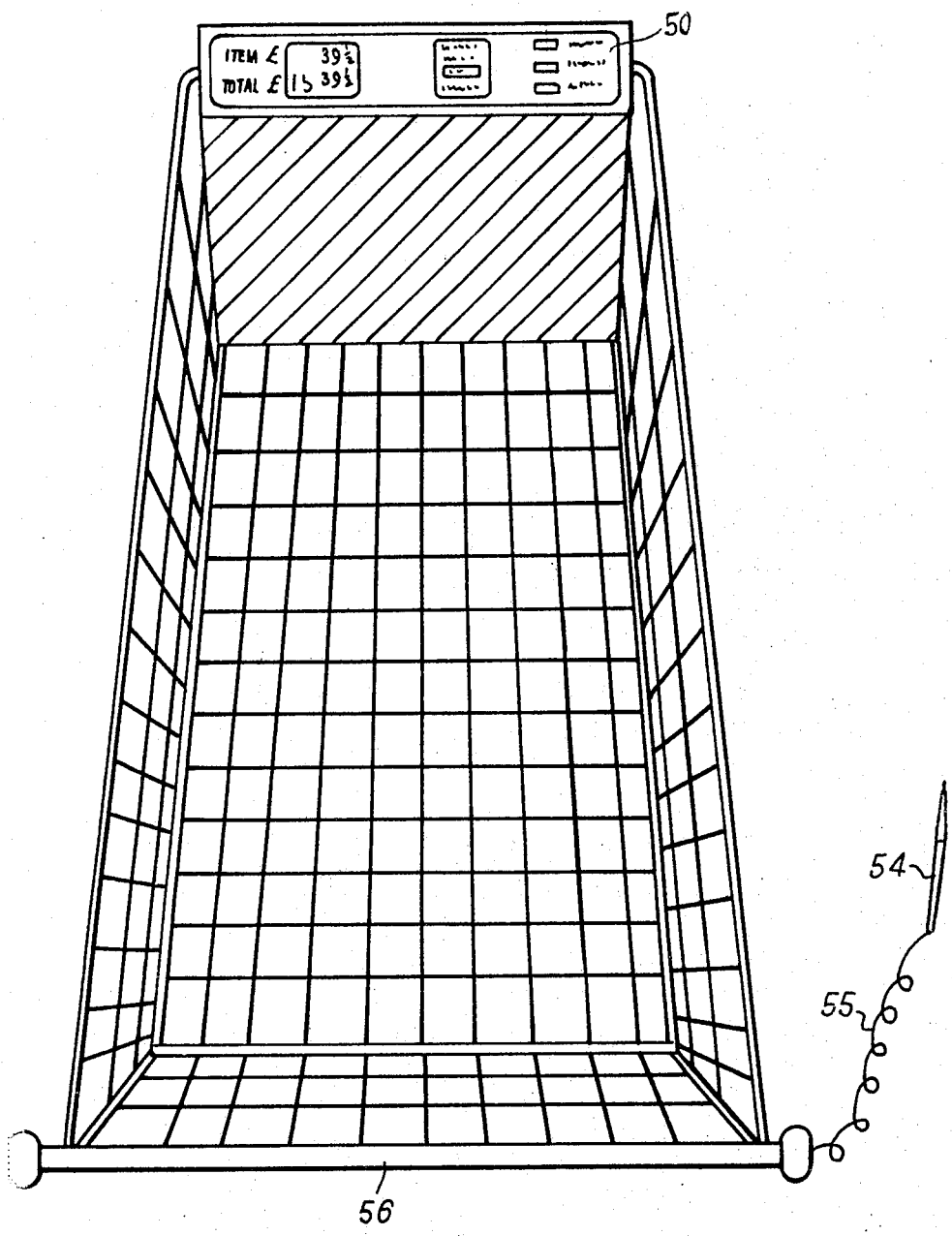
FIG. 6 shows the unit of FIG. 5 installed on a supermarket trolley, which is seen in plan view.

The display unit 50 in the further embodiment of FIGS. 5 and 6 differs from that of FIG. 1 in that it does not include a display window for the aggregate weight and the weight deviation limits, but these are recorded in the unit for subsequent automatic electronic comparison with the actual weight ascertained at the weighing machine. The display has a window 51 which shows the price of the last item and the aggregate price, has a "delete" button 52 for actuation to effect deletion of any previously entered item (the item's bar code is read a second time in order to delete it) and has a plurality of signal indicators 53 which are operated only when the particular condition applies.

FIG. 6 shows how this unit of FIG. 5 is mounted on a conventional supermarket trolley. The unit 50 is mounted at the top of the front of the trolley, where it can conveniently be viewed, and the light pen 54 is attached by its cable 55 to the handlebar 56 of the trolley.

When the principles of the invention as set out above have been understood, the man skilled in the art will not have difficulty in carrying out the invention. Detailed description here of the electronic circuits and programming which may be required is not necessary.

Several embodiments of the invention have been described by way of example, but the invention is not limited to these embodiments.

What is claimed is:

1. A self-service shop comprising
   (a) a plurality of storage locations for items to be bought by customers,
   (b) a plurality of movable receptacles for use by customers to form a collection of items to be bought by selection from said storage locations,
   (c) a plurality of movable electronic recording units associated with said movable receptables, each said unit comprising (i) a memory store programmed, arranged and adapted to record at least data identifying the items selected by a customer for inclusion in said collection (ii) means for inputting to said recording unit information identifying the selected items, (iii) price summing means for summing, on the basis of the said information input into said electronic recording unit, the price of each selected item so as to provide an aggregate price indication for the collection and (iv) means for visually displaying said aggregate price indication to the customer while the collection is being formed,
   (d) weight summing means for summing the gross weight of each selected item recorded in a said memory store to provide an aggregate gross weight indication for the collection, and
   (e) at least one check-out station including means for weighing the collection of items made by a customer to provide a measured gross wieght indication for the collection, which can then be compared with the summed aggregate gross weight.

2. A container apparatus for use by a customer in a self-service shop comprising
   (a) a container for receiving a collection of items selected for purchase by the customer,
   (b) an electronic recording unit mounted on said container and having a memory store for recording data identifying each item included in the collection and (ii) data relating to the aggregate weight and price of the items of the collection, and
   (c) means for inputting said data identifying said item into said memory store at the time of inclusion of the item in the collection,
   said electronic recording unit further including (i) programmed data storage means for storing data relating to weight and price of items available for inclusion in the collection, (ii) programmed calculation means for receiving from said inputting means data identifying each item selected for inclusion in the collection, for extracting the corresponding data of weight and price for each item from said data storage means, for calculating, on the basis of this corresponding data, the aggregate weight and price to the said memory store, and (iii) display means for displaying the aggregate price of the collection stored in the memory store during formation of the collection.

3. A self-service shop according to claim 1 wherein each said movable receptacle has a said movable electronic recording unit mounted thereon.

4. A self-service shop according to claim 1 wherein each said electronic recording unit includes a said weight summing means and further comprises a data store for data of price and gross weight of items stocked by the shop and said price and weight summing means are programmed, adapted and arranged to compute said aggregate price and aggregate gross weight from (i) the said information input to electronic recording unit identifying the selected item and (ii) the data corresponding to that item stored in the said data store.

5. A self-service shop according to claim 1 wherein said electronic recording unit includes display means for the price of the last item for which data was entered in said memory store.

* * * * *

UNITED STATES PATENT AND TRADEMARK OFFICE
CERTIFICATE OF CORRECTION

PATENT NO. : 4,373,133

DATED : February 8, 1983

INVENTOR(S) : Nicholas Clyne; Phillip L. Sturgeon; Laurence H. Wright

It is certified that error appears in the above-identified patent and that said Letters Patent are hereby corrected as shown below:

On the cover page insert the following:

-- [73] Assignee: Wright Clyne Sturgeon Associates Limited Brighton, Sussex, England --.

Signed and Sealed this

Seventeenth Day of July 1984

[SEAL]

Attest:

GERALD J. MOSSINGHOFF

Attesting Officer

Commissioner of Patents and Trademarks